(No Model.)

J. BLANKART.
RUNNER FOR WHEELED VEHICLES.

No. 403,322. Patented May 14, 1889.

Witnesses.
J. Paul Mayer
P. M. Hulbert

Inventor.
John Blankart.
by Thos. S. Sprague & Son
Atty

UNITED STATES PATENT OFFICE.

JOHN BLANKART, OF DETROIT, MICHIGAN, ASSIGNOR OF ONE-HALF TO SIMON C. KARRER, OF SAME PLACE.

RUNNER FOR WHEELED VEHICLES.

SPECIFICATION forming part of Letters Patent No. 403,322, dated May 14, 1889.

Application filed November 21, 1888. Serial No. 291,466. (No model.)

*To all whom it may concern:*

Be it known that I, JOHN BLANKART, a citizen of the United States, residing at Detroit, in the county of Wayne and State of Michigan, have invented certain new and useful Improvements in Sleigh-Runners for Vehicles, of which the following is a specification, reference being had therein to the accompanying drawings.

This invention relates to new and useful improvements in sleigh-runners for temporary use on baby-carriages and other wheeled vehicles; and the invention consists in the peculiar construction of the parts whereby the runners may be readily and securely fastened under the wheels of the vehicle, while the wheels are locked by a peculiarly-constructed clamp, adapted to fit vehicles of different kinds, all as more fully hereinafter described, and shown in the accompanying drawings, in which—

Figure 1:
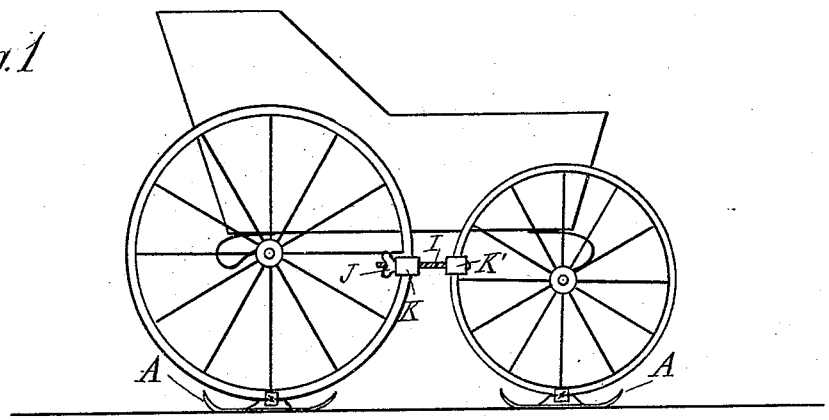
Figures 2, 3:
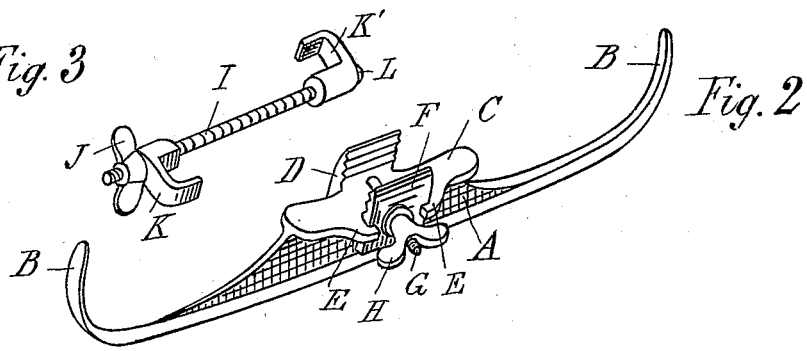
Figures 4, 5:
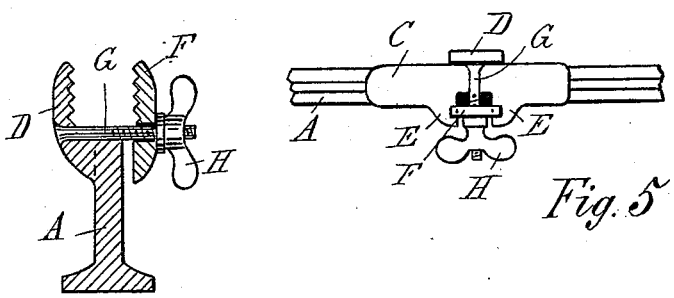

Figure 1 is a side elevation showing my device applied to an ordinary baby-carriage; Fig. 2, a detached perspective view of one of the runners. Fig. 3 is a detached perspective view of the wheel-locking device. Fig. 4 is a cross-section through the clamp of the runner, and Fig. 5 is a plan thereof.

A is a metallic sleigh-runner designed for one wheel only and provided with upturned ends B B and the central raised bearing, C, which is made curved on top to fit the curvature of the wheel, or nearly so, to which it is intended to be secured. This raised bearing C is provided upon one side, integrally with it, with an upwardly-projecting fixed clamp-jaw, D, the inner face of which is serrated. Upon the opposite side of this raised bearing C are formed upwardly-projecting lugs E, between which slidingly engages the movable clamp-jaw F, which is of corresponding shape with the stationary clamp-jaw D and is similarly serrated.

G is a screw-threaded bolt, secured transversely through the bearing C centrally to the clamps, and with its free end projecting loosely through an aperture and the movable clamp-jaw F.

H is a thumb-nut engaging upon the threaded end of the bolt G, and adapted to actuate the movable jaw toward the stationary jaw by turning it. The parts being thus constructed, as shown and described, a runner of this description can be readily and firmly clamped to the rim of the wheel, as shown.

To lock the two wheels in firm relation to each other, I use the device shown in Fig. 3 in detail, and which consists of a screw-threaded tie-rod, I, provided with a head, L, at one end, and a thumb-nut, J, engaging upon the other end; and K and K' are two clamp-hooks loosely sleeved upon a tie-rod, so as to be adapted to be approached to each other by actuating the set-screw J, and being at the same time adapted to be freely projected upon the tie-rod I. Each clamp-hook is L-shaped and conforms to the cross-section of the felly of the wheel, or approximately so.

This device is applied, as shown in Fig. 1, at the point where the front and rear wheel on each side approach each other, the inner side of one clamp-hook being engaged with the rim of one wheel and the other with the rim of the other wheel, one hook being turned inwardly and the other outwardly to adapt it to the different track of the wheels. By tightening the thumb-nut J the wheels may then be firmly locked together.

My device can be readily constructed for the market without being much dependent upon the particular construction and size of the vehicle, which is generally the objection with other constructions of this kind; and, furthermore, no trouble will be experienced in applying this device or removing it from a vehicle, and it may be very conveniently stored away in the body of the vehicle, if not wanted. The whole device may be cheaply constructed of metal, preferably of malleable iron.

What I claim as my invention is—

In a detachable sleigh-runner for wheeled vehicles, the combination of the runners A, provided with the raised bearing C, the stationary jaw D, the movable jaw F, the threaded bolt G and nut H, the wheel-clamping device consisting of the threaded tie-rod I, the clamping-hooks K and K', and the thumb-screw J, the parts being constructed and arranged to operate substantially as described.

In testimony whereof I affix my signature, in presence of two witnesses, this 19th day of October, 1888.

JOHN BLANKART.

Witnesses:
J. PAUL MAYER,
P. M. HULBERT.